United States Patent
Han et al.

(10) Patent No.: US 8,615,198 B2
(45) Date of Patent: Dec. 24, 2013

(54) METHOD AND APPARATUS FOR TRIGGERING MULTICELL MIMO SCHEMES IN MULTIPLE ANTENNA SYSTEM

(75) Inventors: Shuangfeng Han, Suwon-si (KR); David Mazzarese, Suwon-si (KR); Sang-Woo Lee, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 524 days.

(21) Appl. No.: 12/807,117

(22) Filed: Aug. 27, 2010

(65) Prior Publication Data
US 2011/0053633 A1 Mar. 3, 2011

(30) Foreign Application Priority Data

Aug. 27, 2009 (KR) .................. 10-2009-0079576
Mar. 4, 2010 (KR) .................. 10-2010-0019425

(51) Int. Cl.
*H04B 1/00* (2006.01)
(52) U.S. Cl.
USPC .......... 455/63.1; 455/501; 455/522; 370/329; 370/338

(58) Field of Classification Search
USPC ....................................... 455/63.1
See application file for complete search history.

(56) References Cited

U.S. PATENT DOCUMENTS

| 8,019,021 B2* | 9/2011 | Lee et al. ............... 375/324 |
| 2009/0181708 A1* | 7/2009 | Kim et al. .............. 455/501 |
| 2009/0207822 A1* | 8/2009 | Kim et al. .............. 370/338 |
| 2009/0215480 A1* | 8/2009 | Kim et al. .............. 455/501 |

\* cited by examiner

*Primary Examiner* — Fayyaz Alam
*Assistant Examiner* — David Bilodeau

(57) ABSTRACT

A method for triggering multicell MIMO schemes in a multiple antenna system includes transmitting, at a Mobile Station (MS), a first feedback information for single-cell closed-loop MIMO to a Base Station (BS); requesting, at the BS, Normalized Interference Power (NIP) feedback from the MS based on the first feedback information; feeding, at the MS, the NIP back to the BS; selecting, at the BS, a first NIP threshold and a second NIP threshold based on the NIP fed back from the MS; and requesting, at the MS, one of a first MIMO scheme and a second MIMO scheme by comparing the calculated first and second NIPs with the first NIP threshold and the second NIP threshold.

21 Claims, 7 Drawing Sheets

METHOD AND APPARATUS FOR TRIGGERING MULTICELL MIMO SCHEMES IN MULTIPLE ANTENNA SYSTEM

CROSS-REFERENCE TO RELATED APPLICATION(S) AND CLAIM OF PRIORITY

The present application is related to and claims the benefit under 35 U.S.C. §119 to an application filed in the Korean Intellectual Property Office on Aug. 27, 2009, and assigned Serial No. 10-2009-0079576, and an application filed in the Korean Intellectual Property Office on Mar. 4, 2010, and assigned Serial No. 10-2010-0019425, the contents of which are herein incorporated by reference.

TECHNICAL FIELD OF THE INVENTION

The present invention relates generally to triggering a multicell Multiple Input Multiple Output (MIMO) scheme in a multiple antenna system. More particularly, the present invention relates to a method and an apparatus for triggering multicell MIMO schemes according to trigger conditions.

BACKGROUND OF THE INVENTION

Multicell Multiple Input Multiple Output (MIMO) techniques improve a sector throughput and a cell-edge throughput through co-channel interference cancellation, power gain, channel rank/condition advantage, Base Station (BS) macro diversity protection, and multi-BS collaborative precoding. The multicell MIMO techniques can be divided into open-loop (OL) multicell MIMO techniques and closed-loop (CL) multicell MIMO techniques.

Typically, two multicell MIMO schemes are considered. The first scheme is a single BS precoding technique (hereafter, referred to as a first multicell MIMO scheme) with multi-BS coordination, which includes Precoding Matrix Index (PMI) coordination, supported by a feedback-based codebook and interference nulling supported by the codebook based on the feedback or uplink sounding. When CL-MIMO precoding is applied to a serving cell and neighbor cells, the single BS precoding with the multi-BS coordination may be enabled by the BS for one or more Mobile Stations (MSs). Inter Cell Interference (ICI) may be mitigated by coordinating precoders applied to the neighbor cells, based on the feedback from the MSs to the respective serving BSs through the signaling of an upper layer. PMI coordination may be achieved by way of PMI restriction in which the serving BS suggests to use the PMI by informing the neighbor BSs of the PMI causing the interference, using the PMI fed back from the MS, or as PMI recommendation by recommending the PMI for use by informing the neighbor BSs of the PMI which mitigates the interference.

The second scheme is a Joint MIMO transmission across multiple BSs technique (hereafter, referred to as a second multicell MIMO scheme). The BS and the MS optionally support both adaptive precoding and non-adaptive precoding. The adaptive precoding is based on multi-BS joint processing such as CL-Macro Diversity (MD) and Collaborative (Co)-MIMO. When the adaptive precoding or the non-adaptive precoding is applied to the serving cell and the neighbor cells and user data is shared among the multiple cells, the multi-BS joint MIMO processing may be enabled by the BS for one or more MSs. Using the adaptive precoding, a precoder matrix $W_k$ is generated from the feedback of the MS such as codebook and sounding channel. The two adaptive precodings based on the multi-BS joint processing support the CL-MD and the Co-MIMO. When the CL-MD is activated, a plurality of BSs conducts the joint MIMO transmission to one MS. When the Co-MIMO is activated, the multiple BSs conduct the joint MIMO transmission to a plurality of MSs through multi-user MIMO scheduling and precoding.

The first multicell MIMO scheme and the second multicell MIMO scheme as discussed above require a trigger mechanism design to optionally apply them according to a channel environment. When the trigger mechanism is not designed, many MSs moving in the cell edge need to feed back corresponding information such as Received Signal Strength Indicator (RSSI), Signal-Interference-plus-Noise Ratio (SINR), and PMI for the serving BS or an interference BS, Normalized Interference Power (NIP) of each interference BS, or interference power of the interference BS. In addition, each BS needs to carry out the complicated scheduling based on a lot of other feedback information.

In this respect, what is needed is a mechanism for efficiently triggering the multicell MIMO schemes in a multiple antenna system.

SUMMARY OF THE INVENTION

To address the above-discussed deficiencies of the prior art, it is a primary aspect of the present invention to solve at least the above-mentioned, problems and/or disadvantages and to provide at least the advantages described below. Accordingly, an aspect of the present invention is to provide a method and an apparatus for triggering multicell MIMO schemes in a multiple antenna system.

According to one aspect of the present invention, a method for triggering multicell Multiple Input Multiple Output (MIMO) schemes in a multiple antenna system includes transmitting, at a Mobile Station (MS), first feedback information for single-cell closed-loop MIMO to a Base Station (BS); requesting, at the BS, Normalized Interference Power (NIP) feedback from the MS based on the first feedback information; feeding, at the MS, the MP back to the BS; selecting, at the BS, a first NIP threshold and a second NIP threshold based on the NIP fed back from the MS; and requesting, at the MS, one of a first MIMO scheme and a second MIMO scheme by comparing the calculated first and second NIPs with the first NIP threshold and the second NIP threshold.

According to another aspect of the present invention, a method for triggering multicell MIMO schemes in a multiple antenna system includes transmitting, at an MS, a first feedback information for single-cell closed-loop MIMO to a BS; requesting, at the BS, NIP feedback from the MS based on the first feedback information; feeding, at the MS, the NIP back to the BS; selecting, at the BS, a first NIP and a second NIP based on the NIP fed back from the MS; and selecting, at the BS, one of a first MIMO scheme and a second MIMO scheme by comparing the first and second NIPs with a first NIP threshold and a second NIP threshold.

According to yet another aspect of the present invention, a method for triggering multicell MIMO schemes in a multiple antenna system includes calculating, at Mobile Stations (MSs), a Normalized Interference Power (NIP) and feeding the NIP back to a Base Station (BS); selecting, at the BS, a first NIP threshold and a second NIP threshold based on the NIP fed back from the MS; and selecting, at the BS, one of the first MIMO scheme and the second MIMO scheme by comparing first and second NIPs received by the MSs with the first NIP threshold and the second NIP threshold.

According to still another aspect of the present invention, an MS operating method for triggering multicell MIMO schemes in a multiple antenna system includes receiving a first NIP threshold and a second NIP threshold from a BS, and determining a first NIP and a second NIP; and confirming trigger conditions by comparing the first NIP threshold with the first NIP and the second NIP threshold with the second NIP.

According to a further aspect of the present invention, a BS operating method for triggering multicell MIMO schemes in a multiple antenna system includes selecting a first NIP threshold and a second NIP threshold; broadcasting the first NIP threshold and the second NIP threshold; and after broadcasting the first NIP threshold and the second NIP threshold, receiving an event-driven request from an MS to operate in a first MIMO scheme or a second MIMO scheme.

According to a further aspect of the present invention, an apparatus of an MS for triggering multicell MIMO schemes in a multiple antenna system includes a mode determiner configured to receive a first NIP threshold and a second NIP threshold from a BS, determine a first NIP and a second NIP, and confirm trigger conditions by comparing the first NIP threshold with the first NIP and the second NIP threshold with the second NIP.

According to a further aspect of the present invention, an apparatus of a BS for triggering multicell MIMO schemes in a multiple antenna system includes a controller configured to select a first NIP threshold and a second NIP threshold; and a preprocessor configured to broadcast the first NIP threshold and the second NIP threshold, and after broadcasting the first NIP threshold and the second NIP threshold, receive an event-driven request from an MS to operate in a first MIMO scheme or a second MIMO scheme.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged multiple antenna system.

Exemplary embodiments of the present invention provide a method and an apparatus for triggering multicell Multiple Input Multiple Output (MIMO) schemes in a multiple antenna system. The first multicell MIMO scheme is a single Base Station (BS) precoding scheme in which a corresponding Mobile Station (MS) is serviced by a single BS, and the second multicell MIMO scheme is a Joint MIMO transmission scheme in which a corresponding MS is serviced by a plurality of BSs.

Hereinafter, while the Institute of Electrical and Electronics Engineers (IEEE) 802.16m standard is mainly illustrated, the present invention is applicable to any system using multicell MIMO schemes.

Three mechanisms for triggering the multicell MIMO schemes are now explained.

According to the first trigger mechanism, the BS broadcasts or unicasts Normalized Interference Power (NIP) thresholds NIP_th_1 and NIP_th_2 for triggering the two multicell MIMO schemes. The MS receives the NIP thresholds, determines an appropriate multicell MIMO scheme, and requests the determined scheme from the BS. The NIP is defined as a ratio of an average interference power (with or without a transmitter precoder) from one dominant interference BS to a total interference power received by MSs. The NIP_th_1 is a threshold for the NIP of one adjacent BS, and the NIP_th_2 is a threshold for the sum NIP of two or more adjacent BSs. Based on downlink channel measurement, the MS selects N-ary BSs, whose per BS NIP is higher than the threshold NIP_th_1 and the sum NIP of the N-ary BSs is larger than the threshold NIP_th_2.

According to the second trigger mechanism, the BS selects the thresholds NIP_th_1 and NIP_th_2 to trigger the two multicell MIMO schemes, determines the multicell MIMO schemes based on the NIP value fed back from the MS, and requests feedback information necessary for the appropriate multicell MIMO scheme from the corresponding MS.

According to the third trigger mechanism, based on the channel measures, the MS determines whether to request the appropriate multicell MIMO schemes by comparing a NIP measured at a corresponding point with predetermined NIP thresholds, and requests the determined scheme from the BS.

Figure 1:
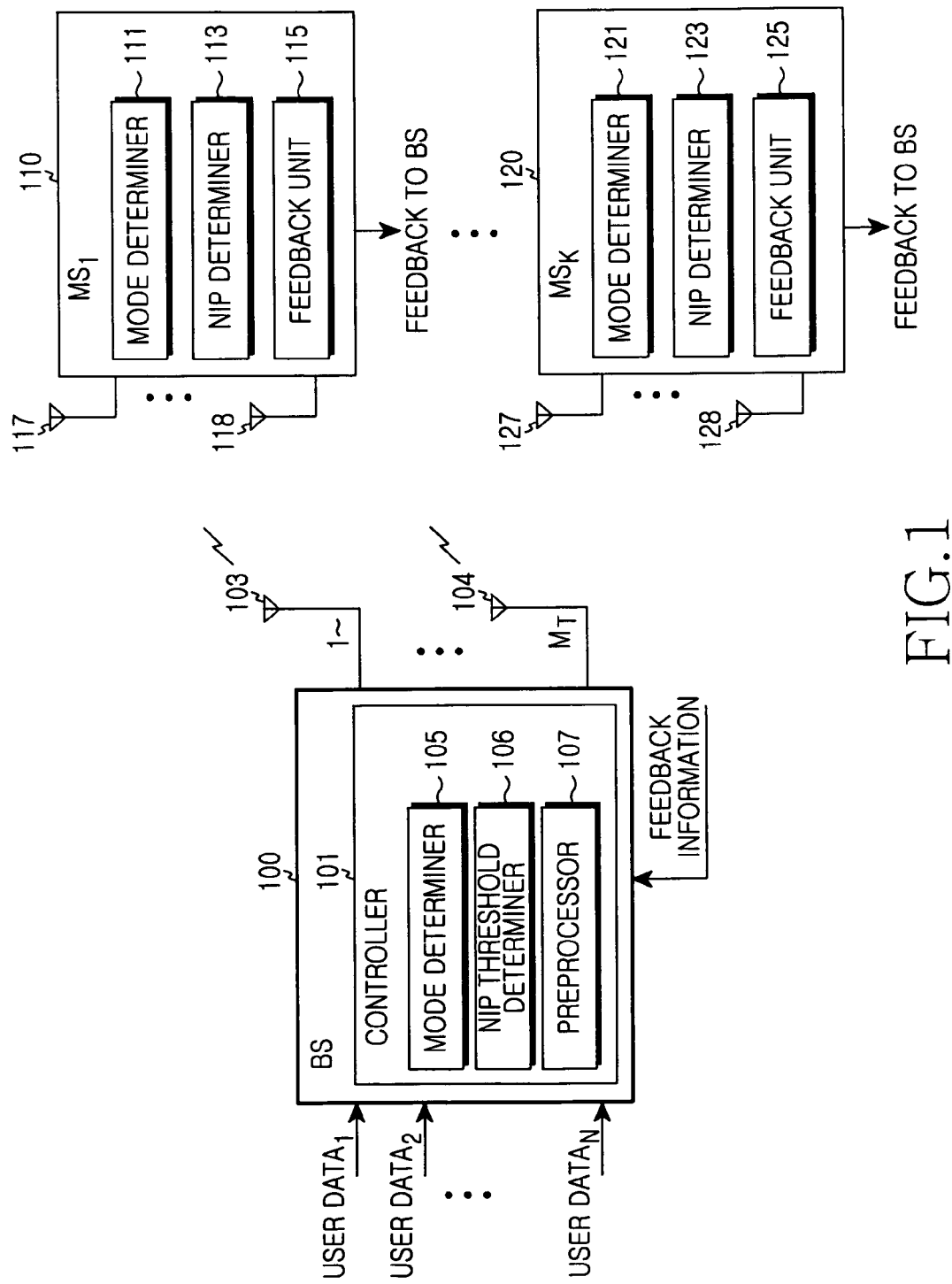
FIG. 1 is a block diagram of a multiple antenna system according to an exemplary embodiment of the present invention.

FIG. 1 depicts a multiple antenna system according to an exemplary embodiment of the present invention.

In the multiple antenna system of the multi-user environment in FIG. 1, downlink signals transmitted by the BS 100 via $M_T$-ary transmit antennas 103 through 104 according to the first multicell MIMO scheme are received at K-ary MSs 110 through 120. Alternatively, in the multiple antenna system of the multi-user environment, downlink signals transmitted by neighbor BSs including the BS 100 via a plurality of transmit antennas according to the second multicell MIMO scheme are received at the K-ary MSs 110 through 120.

According to the first trigger mechanism, a controller 101 of the BS 100 controls operations of the BS 100. The controller 101 requests NIP report from the plurality of the MSs using a Feedback_Polling_IE message. The NIP request is based on CQI and RSSI feedback information of the MS. Herein, the NIP is defined as the ratio of the average interference power from one dominant interference BS to the total interference power received by the MSs. The NIP_th_1 is a threshold for the NIP of one adjacent BS, and the NIP_th_2 is a threshold for the sum NIP of two or more adjacent BSs. Based on downlink channel measurement, the MS selects multiple BSs (i.e., N-ary BSs), whose per BS NIP is higher than the threshold NIP_th_1 and sum NIP of the N-ary BSs is larger than the threshold NIP_th_2.

A threshold determiner 106 of the BS 100 determines the threshold NIP_th_1 for triggering the first multicell MIMO scheme and the threshold NIP_th_2 for triggering the second multicell MIMO scheme based on network measurements. That is, the BS may determine NIP_th_1 and NIP_th_2 using the fed-back NIP values of the MS. For example, the BS may determine the thresholds such that the greatest NIP values of the NIP values fed back from the MS constitute 5 percentage of the total NIP values fed back from the MS. Typically, NIP_th_1 is smaller than NIP_th_2. In various implementations, the BS 100 does not request the NIP report from multiple MSs, but may periodically receive the NIP report from the MSs. A preprocessor 107 of the BS 100 broadcasts the NIP_th_1 and the NIP_th_2 (additional broadcast messages) using downlink broadcast messages based on an Orthogonal Frequency Division Multiplexing (OFDM) communication scheme. In another implementation, the BS unicasts a message including the NIP_th_1 and the NIP_th_2. Upon receiving the request for the first multicell MIMO scheme or the second multicell MIMO scheme from the corresponding MS, the controller 101 of the BS 100 requests feedback information for the proper multicell MIMO scheme. That is, the BS 100 requests necessary feedback information for the multicell MIMO scheme requested by the corresponding MS, or requests the feedback information for the allowable multicell MIMO scheme when the BS 100 cannot accept the multicell MIMO scheme requested by the corresponding MS.

According to the first trigger mechanism, feedback unit 115 through 125 of the MSs 110 through 120 feed information for CL-MIMO operation including Channel Quality Indicator (CQI), Precoding Matrix Index (PMI), and rank back to the BS 100 in a general process of the single-cell CL-MIMO. Receivers of the MSs 110 through 120 receive the NIP_th_1 and the NIP_th_2 triggering the multicell MIMO schemes through the broadcast messages based on the OFDM. NIP determiners 113 through 123 of the MSs 110 through 120 calculate the NIP using the average interference power from the dominant interference BS and the total interference power received by the MSs. Mode determiners 111 through 121 of the MSs 110 through 120 determine the corresponding multicell MIMO scheme by comparing the calculated NIP with the received NIP_th_1 and NIP_th_2 and confirming conditions for triggering the multicell MIMO schemes. Controllers of the MSs 110 through 120 request an event for operating in the corresponding multicell MIMO scheme from the serving BS according to the conditions, and provide feedback information for the corresponding multicell MIMO scheme.

According to the second trigger mechanism, a mode determiner 105 of the BS 100 confirms conditions for triggering the multicell MIMO schemes by comparing the NIP fed back from the MS with the NIP_th_1 and the NIP_th_2. Based on the result of the comparison, the controller 101 of the BS 100 requests feedback information for the first multicell MIMO scheme or the second multicell MIMO scheme.

According to the third trigger mechanism, controllers of the MSs 110 through 120 determine whether to request an event for the multicell MIMO scheme operation, based on the downlink measures such as CQI, SINR, NIP, or RSSI.

The mode determiners 111 through 121 of the MSs 110 through 120 determine the trigger conditions by comparing the calculated NIP with the predetermined NIP thresholds (NIP_th_1 and NIP<NIP_th_2).

Figure 2:
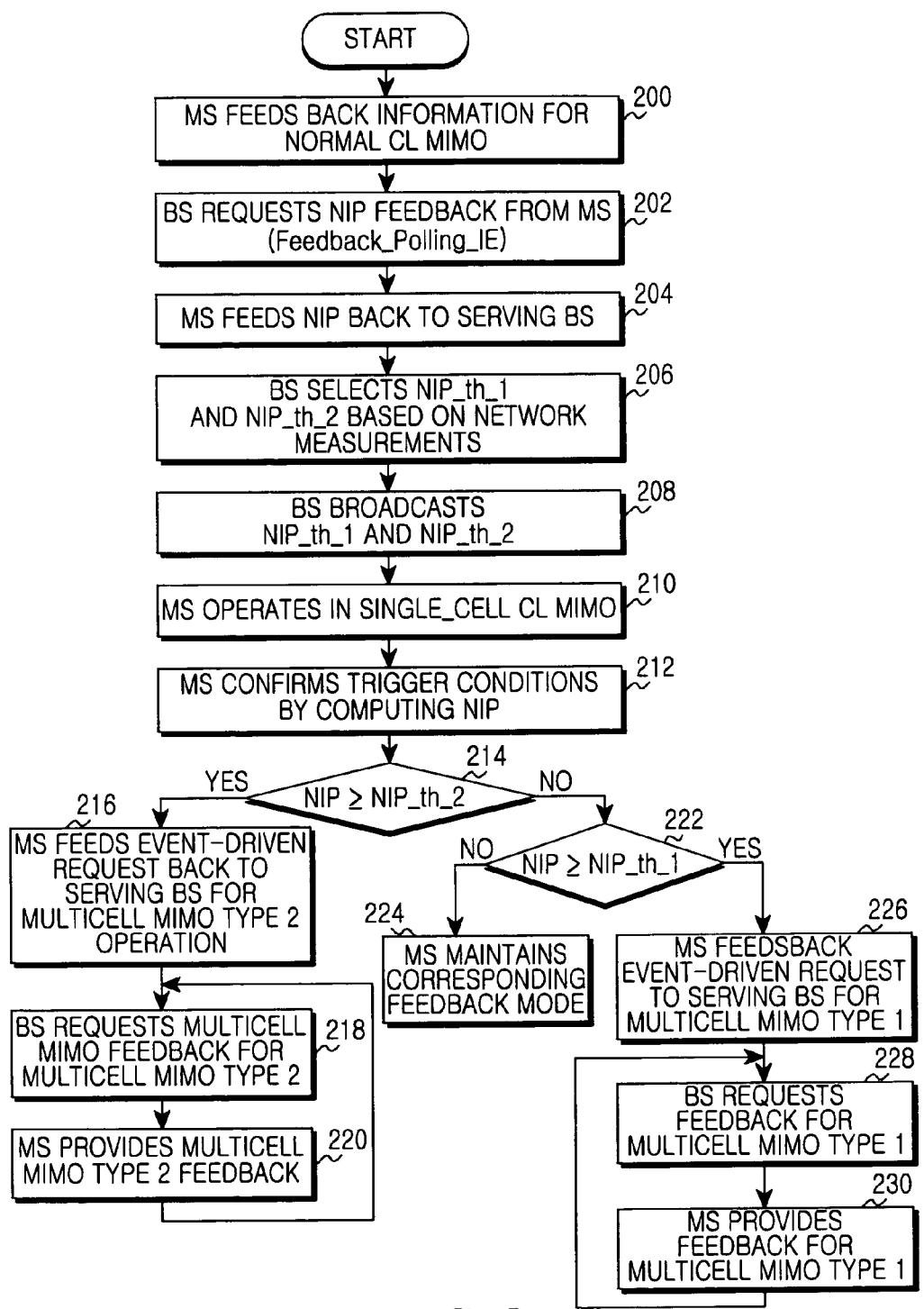
FIG. 2 is a flowchart of a method for triggering multicell MIMO schemes in the multiple antenna system according to one exemplary embodiment of the present invention.

FIG. 2 is a flowchart of a method for triggering the multicell MIMO schemes in the multiple antenna system according to one exemplary embodiment of the present invention.

In step 200, the MS feeds back the information for the CL-MIMO operation including the CQI, the PMI, and the rank in the normal process of the single-cell CL-MIMO, back to the BS.

In step 202, the BS requests the NIP report from the multiple MSs using the feedback_Polling_IE message. The NIP request is determined based on the CQI and RSSI feedback information from the MS. Herein, the NIP is defined as the ratio of the average interference power from one dominant interference BS to the total interference power received by the MSs.

Upon receiving the feedback_Polling_IE message requesting the NIP feedback, the MS feeds back the NIP using a MAC management message in step 204. In various implementations, the MS can periodically feed the NIP back to the BS, regardless of the BS request.

In step 206, the BS determines the first threshold NIP_th_1 and the second threshold NIP_th_2 for triggering the MIMO schemes based on the network measurements. The NIP_th_1 is the threshold for the NIP of one adjacent BS, and the NIP_th_2 is the threshold for the sum NIPs of two or more adjacent BSs.

That is, using the NIP values fed back from the MS, the BS can determine the NIP_th_1 and the NIP_th_2. For example, the BS may determine the thresholds such that the greatest NIP values of the NIP values fed back from the MS constitute 5 percentage of the total NIP values fed back from the MS. Mostly, the NIP_th_1 is smaller than the NIP_th_2.

In step 208, the BS broadcasts the NIP_th_1 and the NIP_th_2 (additional broadcast messages) through downlink broadcast messages. In another implementation, the BS unicasts a message including the NIP_th_1 and the NIP_th_2.

The MS operates in the single-cell CL-MIMO mode in step 210. In step 212, the MS calculates a first NIP and a second NIP using the ratio of the average interference power from the dominant interference BS to the total interference power received by the MSs, and confirms the multicell MIMO scheme trigger conditions. The first NIP is the per BS NIP of the neighbor BSs, and the second NIP is the sum NIP when the per BS NIP is higher than the threshold NIP_th_1.

When the second NIP<the NIP_th_2 in step 214 and the first NIP≥the NIP_th_1 in step 222, the MS feeds back an event-driven request to enter the first multicell MIMO scheme in step 226.

Upon receiving the first multicell MIMO scheme operation request from the MS, the BS requests the feedback information required for the first multicell MIMO scheme from the MS using the Feedback_Polling_IE message in step 228. For example, the BS requests the multicell MIMO feedback information for the PMI coordination from the MS by using the Feedback_Polling_IE message.

In various implementations, when the BS cannot perform in the first multicell MIMO scheme, the BS can ignore the feedback information request for the first multicell MIMO scheme from the MS.

In step 230, the MS feeds the information required for the first multicell MIMO scheme requested by the BS, back to the BS. That is, the MS provides the multicell MIMO feedback information for the PMI coordination, such as recommended PMI or restricted PMIs, corresponding BSID (or temp ID), and NIPs.

When the second NIP≥the NIP_th_2 in step 214, the MS feeds an event-driven request back to the BS using a MAC management message to operate in the second multicell MIMO scheme in step 216. The MAC management message includes bitmap information indicating the neighbor BSs.

In step 218, the BS requests feedback information required for the second multicell MIMO scheme operation to the MS using a Feedback_Polling_IE message.

Upon receiving the Feedback_Polling_IE message requesting the feedback information required for the second multicell MIMO scheme operation, the MS periodically sends a feedback header together with the requested information in case of the codebook feedback, or sends uplink sounding allocated by Sounding_Allocation_IE( ) in case of the sounding feedback in step 220.

Meanwhile, when receiving the feedback information from the multiple MSs based on the codebook feedback, the BS forwards the PMIs to the neighbor BS to coordinate the PMI use. As for the sounding feedback, the relevant BSs can perform the precoding based on the sounding signal received from one MS for CL-MD or from the multiple MSs for Co-MIMO.

When the NIP<the NIP_th_1 in step 222, the MS maintains the single cell CL-MIMO mode in step 224.

Figure 3:
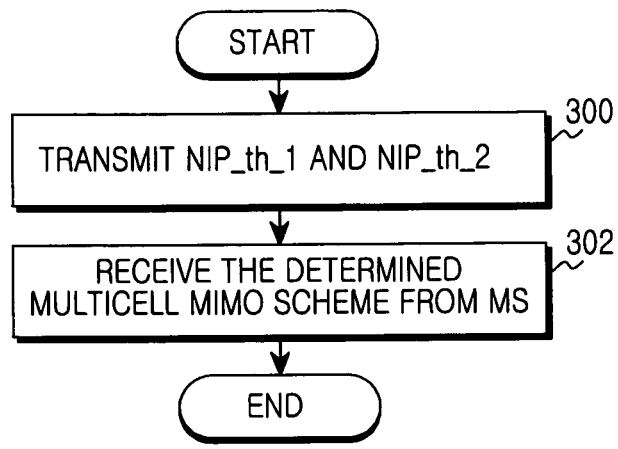
FIG. 3 is a flowchart of operations of a base station for triggering the multicell MIMO schemes in the multiple antenna system according to one exemplary embodiment of the present invention.

FIG. 3 is a flowchart of operations of the BS for triggering the multicell MIMO schemes in the multiple antenna system according to one exemplary embodiment of the present invention.

In step 300, the BS transmits the first threshold NIP_th_1 and the second threshold NIP_th_2 for triggering the multicell MIMO schemes, to the plurality of the MSs.

In step 302, the BS receives the multicell MIMO scheme determined by the corresponding MS. Herein, the MIMO scheme determined by the corresponding MS is determined by comparing the thresholds and the normalized interference power.

Figure 4:
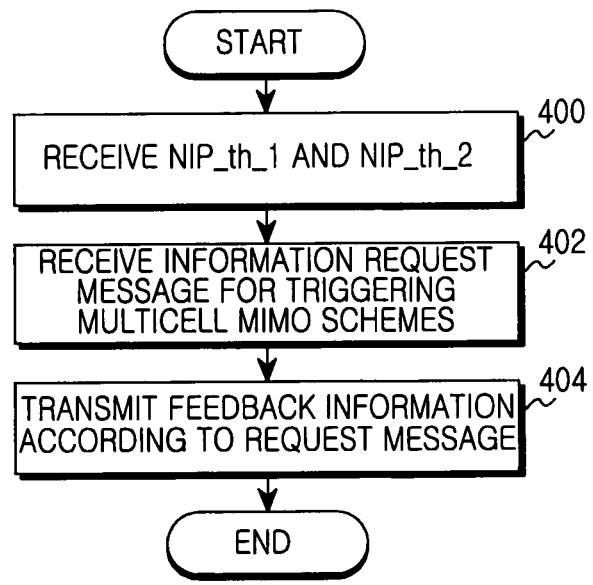
FIG. 4 is a flowchart of operations of a mobile station for triggering the multicell MIMO schemes in the multiple antenna system according to one exemplary embodiment of the present invention.

FIG. 4 is a flowchart of operations of the MS for triggering the multicell MIMO schemes in the multiple antenna system according to one exemplary embodiment of the present invention.

In step 400, the MS receives the first threshold NIP_th_1 and the second threshold NIP_th_2 for triggering the multicell MIMO schemes, from the BS.

In step 402, the MS receives the feedback information request message for triggering the multicell MIMO schemes from the BS.

In step 404, the MS transmits feedback information to the BS according to the request message from the BS. The feedback information is the normalized interference power measured by the MS, or the multicell MIMO scheme determined by comparing the normalized interference power measured by the MS with the received thresholds.

Figure 5:
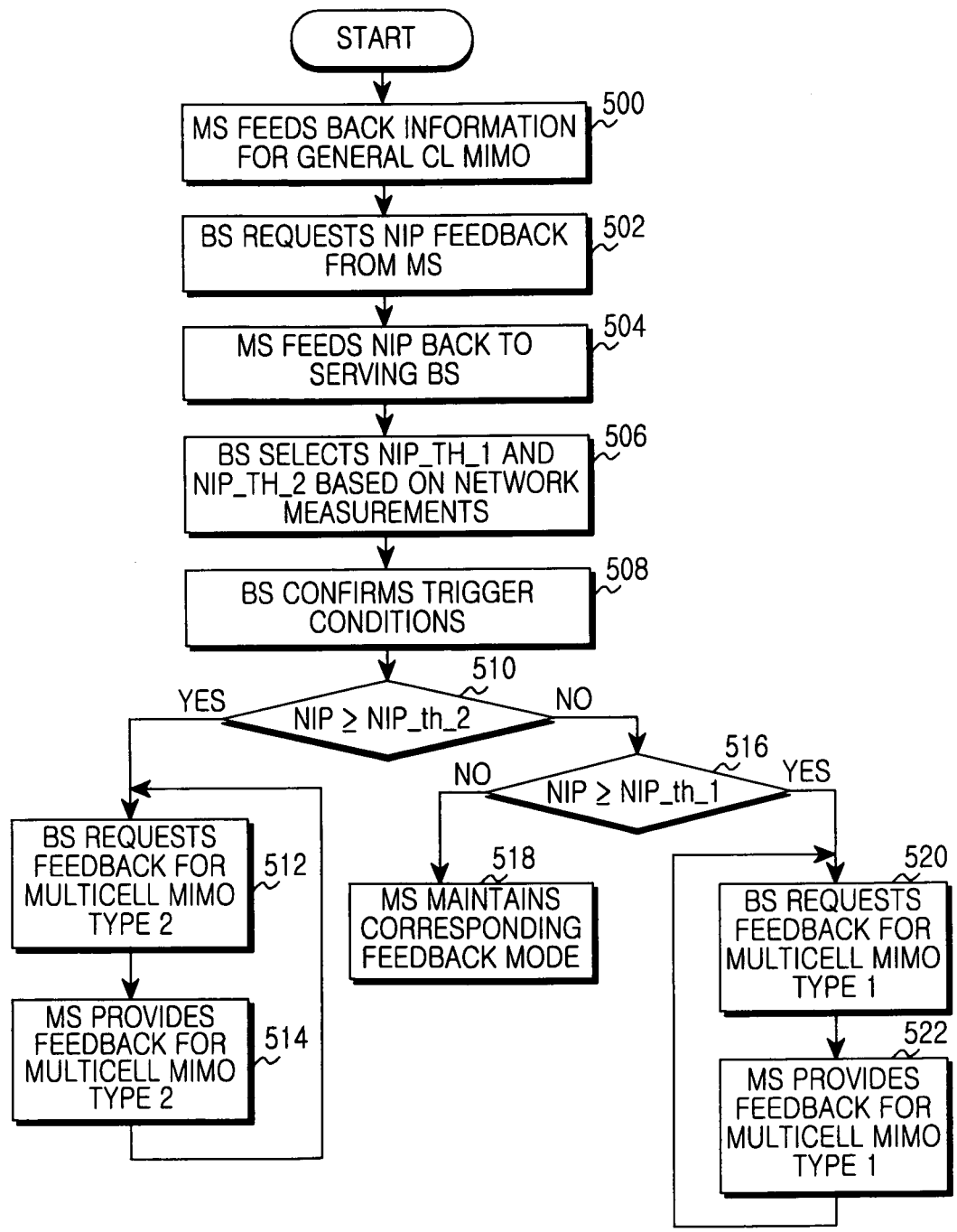
FIG. 5 is a flowchart of a method for triggering the multicell MIMO schemes in the multiple antenna system according to another exemplary embodiment of the present invention.

FIG. 5 is a flowchart of a method for triggering the multicell MIMO schemes in the multiple antenna system according to another exemplary embodiment of the present invention.

In step 500, the MS feeds the information for the CL-MIMO operation including the CQI, the PMI, and the rank in the general process of the single-cell CL-MIMO, back to the BS.

In step 502, the BS requests the NIP report from the multiple MSs using the feedback_Polling_IE message. The NIP request is based on the CQI and RSSI feedback information of the MS. Herein, the NIP is defined as the ratio of the average interference power from one dominant interference BS to the total interference power received by the MSs.

Upon receiving the feedback_Polling_IE message requesting the NIP feedback, the MS feeds back the NIP using the MAC management message in step 504. In various implementations, the MS can periodically feed the NIP back to the BS, regardless of the BS request.

In step 506, the BS determines the threshold NIP_th_1 for triggering the first multicell MIMO scheme and the threshold NIP_th_2 for triggering the second multicell MIMO scheme based on the network measurements. That is, the BS may determine the NIP_th_1 and the NIP_th_2 using the fed back NIP values of the MSs. For example, the BS can determine the thresholds such that the greatest NIP values of the NIP values fed back from the MS constitute 5 percentage of the total NIP values fed back from the MS. Typically, the NIP_th_1 is smaller than the NIP_th_2.

In step 508, the BS confirms the trigger conditions by comparing the NIP fed back from the MS with the NIP_th_1 and the NIP_th_2. To check the trigger conditions, the BS determines a first NIP and a second NIP from the fed back NIP. The first NIP is the per BS NIP of the neighbor BSs, and the second NIP is the sum NIP, when the per BS NIP is higher than the threshold NIP_th_1.

When the second NIP<the NIP_th_2 in step 510 and the first NIP≥the NIP_th_1 in step 516, the BS requests feedback information required for the first multicell MIMO scheme from the MS using the Feedback_Polling_IE message in step 520. For example, the BS requests the multicell MIMO feedback from the MS for the PMI coordination using the Feedback_Polling_IE message.

In various implementations, when the BS cannot operate in the first multicell MIMO scheme, the BS can disregard the request from the MS.

In step 522, the MS feeds the information required for the corresponding multicell MIMO scheme requested by the BS, back to the BS. That is, the MS provides the multicell MIMO feedback information for the PMI coordination, such as recommended PMI or restricted PMIs, corresponding BSID (or temp ID) and NIPs.

When the second NIP≥the NIP_th_2 in step 510, the BS requests feedback information required for the second multicell MIMO scheme operation from the MS using the Feedback_Polling_IE in step 512.

Upon receiving the Feedback_Polling_IE message requesting the necessary feedback information for the second multicell MIMO scheme operation, the MS periodically sends the feedback header together with the requested information in case of the codebook feedback, or sends the uplink sounding allocated by Sounding_Allocation_IE( ) in case of the sounding feedback in step 514. Meanwhile, upon receiving the feedback information from the multiple MSs based on the codebook feedback, the BS forwards the PMIs to the neighbor BS to coordinate the PMI use. As for the sounding feedback, the relevant BSs can perform the precoding based on the sounding signal received from one MS for CL-MD or from multiple MSs for Co-MIMO.

When the first NIP<the NIP_th_1 in step 516, the MS maintains the corresponding mode in step 518.

Figure 6:
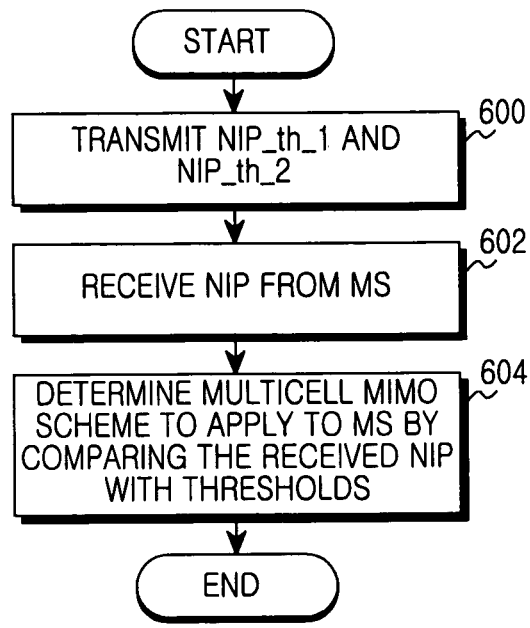
FIG. 6 is a flowchart of operations of the base station for triggering the multicell MIMO schemes in the multiple antenna system according to another exemplary embodiment of the present invention.

FIG. 6 is a flowchart of operations of the BS for triggering the multicell MIMO schemes in the multiple antenna system according to another exemplary embodiment of the present invention.

In step 600, the BS transmits the first threshold NIP_th_1 and the second threshold NIP_th_2 for triggering the multicell MIMO schemes, to a plurality of MSs.

In step 602, the BS receives the normalized interference power from the MSs.

In step 604, the BS determines the multicell MIMO scheme to apply to at least one MS by comparing the received normalized interference power with the thresholds.

Figure 7:
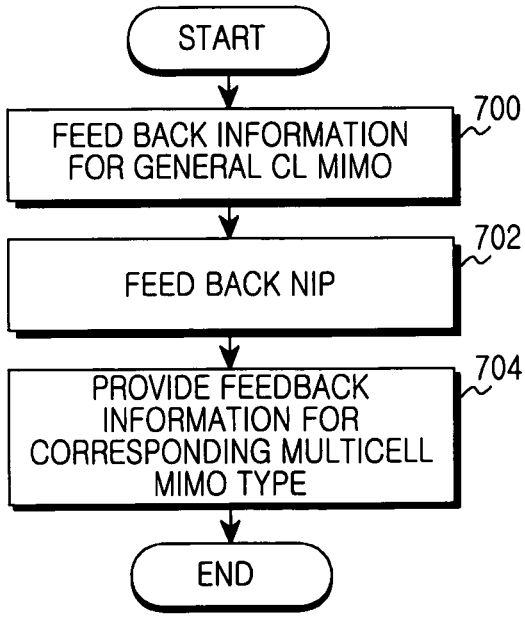
FIG. 7 is a flowchart of operations of the mobile station for triggering the multicell MIMO schemes in the multiple antenna system according to another exemplary embodiment of the present invention.

FIG. 7 is a flowchart of operations of the MS for triggering the multicell MIMO schemes in the multiple antenna system according to another exemplary embodiment of the present invention.

In step 700, the MS feeds back information for CL-MIMO operation including the CQI, the PMI, and the rank in the general process of single-cell CL-MIL, back to the BS.

Upon receiving the Feedback_Polling_IE message requesting the NIP feedback, the MS feeds back the NIP using the MAC management message in step 702. In various implementations, the MS can periodically feed the NIP back to the BS, regardless of the BS request.

When the BS requests the feedback information for the first multicell MIMO scheme or the second multicell MIMO scheme, the MS sends the feedback information for the corresponding multicell MIMO scheme in step 704.

Figure 8:
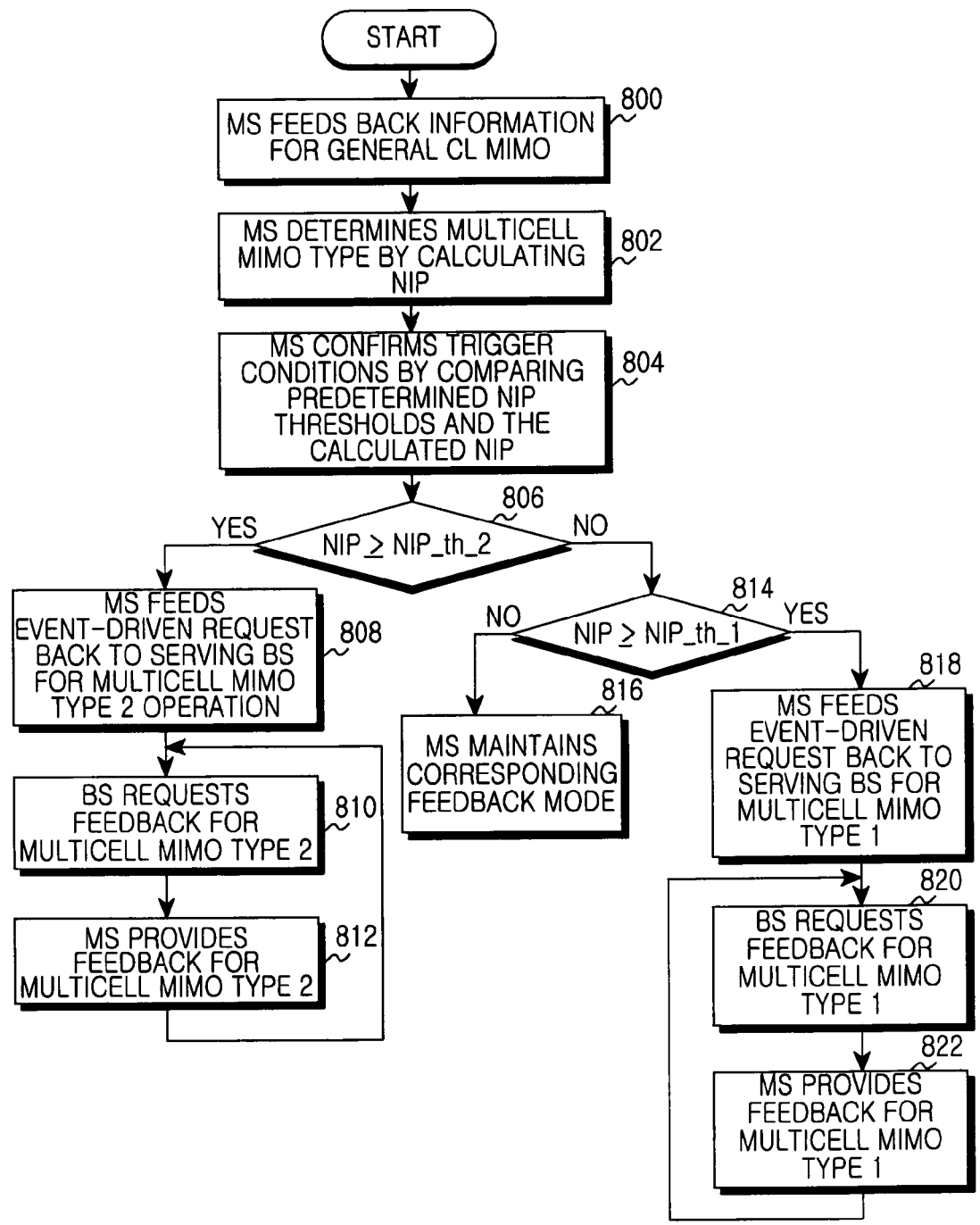
FIG. 8 is a flowchart of a method for triggering multicell MIMO schemes in the multiple antenna system according to yet another exemplary embodiment of the present invention.

FIG. 8 is a flowchart of a method for triggering the multicell MIMO schemes in the multiple antenna system according to yet another exemplary embodiment of the present invention.

In step 800, the MS feeds back the information for CL-MIMO operation including the CQI, the PMI, and the rank in the general process of the single-cell CL-MIMO, back to the BS.

In step 802, based on the downlink measurements such as CQI, SINR, NIP, or RSSI, the MS determines whether to request a trigger event for the multicell MIMO scheme operation.

When the trigger event for the multicell MIMO scheme operation is required, the MS determines trigger conditions by comparing the calculated first and second NIPs with the predetermined NIP thresholds (NIP_th_1 and NIP<NIP_th_2) in step 804. Herein, the first NIP is the NIP per BS (per BS NIP) of the neighbor BSs, and the second NIP is the sum NIP when the per BS NIP is higher than the threshold NIP_th_1.

When the calculated second NIP<the NIP_th_2 in step 806 and the first NIP≥the NIP_th_1 in step 814, the MS feeds back an event-driven request to enter the first multicell MIMO scheme in step 818.

Upon receiving the first multicell MIMO scheme operation from the MS, the BS requests the feedback information required for the first multicell MIMO scheme from the MS using the Feedback_Polling_IE in step 820. For example, the BS requests the multicell MIMO feedback for the PMI coordination from the MS by use of the Feedback_Polling_IE.

In various implementations, when the BS cannot work in the first multicell MIMO scheme, the BS can ignore the request from the MS.

In step 822, the MS feeds the information required for the first multicell MIMO scheme requested by the BS, back to the BS.

That is, the MS provides the multicell MIMO feedback information for the PMI coordination, such as recommended PMI or restricted PMIs, corresponding BSID (or temp ID), and NIPs.

When the second NIP≥the NIP_th_2 in step 806, the MS feeds an event-driven request back to the BS using the MAC management message to operate in the second multicell MIMO scheme in step 808.

In step 810, the BS requests feedback information required for the second multicell MIMO scheme operation from the MS using the Feedback_Polling_IE.

Upon receiving the Feedback_Polling_IE requesting the feedback information required for the second multicell MIMO scheme operation, the MS periodically sends the feedback header together with the requested information in case of the codebook feedback, or sends the uplink sounding allocated by Sounding_Allocation_IE( ) in case of the sounding feedback in step 812. Meanwhile, upon receiving the feedback information from the multiple MSs based on the codebook feedback, the BS forwards the PMIs to the neighbor BS to coordinate the PMI use. As for the sounding feedback, the relevant BSs can perform the precoding based on the sounding signal received from one MS for CL-MD or from multiple MSs for Co-MIMO.

When the NIP<the NIP_th_1, the MS maintains the corresponding MIMO mode in step 816.

Figure 9:
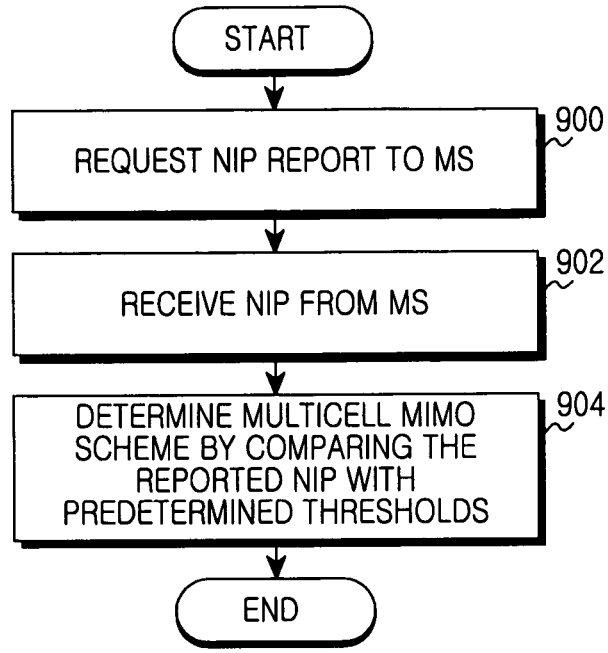
FIG. 9 is a flowchart of operations of the base station for triggering the multicell MIMO schemes in the multiple antenna system according to yet another exemplary embodiment of the present invention.

FIG. 9 is a flowchart of operations of the BS for triggering the multicell MIMO schemes in the multiple antenna system according to yet another exemplary embodiment of the present invention.

In step 900, the BS sends a message to the MSs instructing the MSs to report the normalized interference power value.

In step 902, the BS receives the normalized interference power value from the MSs.

In step 904, the BS determines the multicell MIMO scheme to apply to the corresponding MS by comparing the normalized interference power value reported from at least one MS with the predetermined thresholds.

Figure 10:
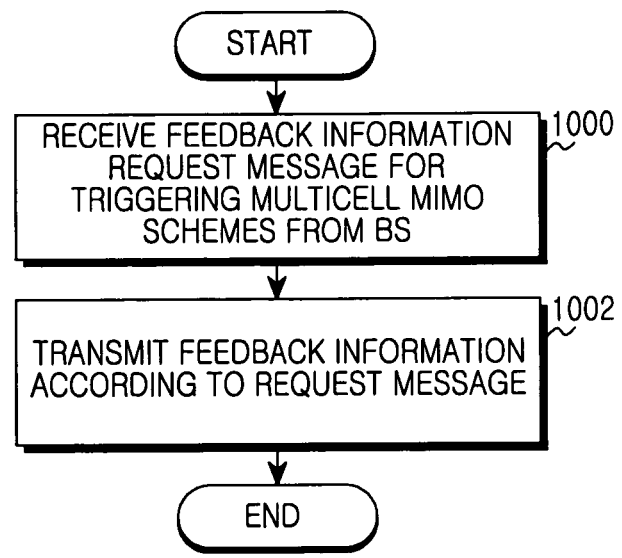
FIG. 10 is a flowchart of operations of the mobile station for triggering the multicell MIMO schemes in the multiple antenna system according to yet another exemplary embodiment of the present invention.

FIG. 10 is a flowchart of operations of the MS for triggering the multicell MIMO schemes in the multiple antenna system according to yet another exemplary embodiment of the present invention.

In step 1000, the MS receives from the BS a feedback information request message to trigger the multicell MIMO scheme.

In step 1002, the MS sends the feedback information according to the feedback information request message received from the BS. The feedback information is the normalized interference power value measured by the MS.

As set forth above, by virtue of the mechanism for triggering the multicell MIMO schemes in the multiple antenna system, the information fed back from the MS in the cell edge can be reduced and the scheduling complexity can be diminished.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for triggering multicell Multiple Input Multiple Output (MIMO) schemes in a multiple antenna system, the method comprising:
   receiving, at a Base Station (BS), a first feedback information for single-cell closed-loop MIMO from a Mobile Station (MS);
   requesting, at the BS, Normalized Interference Power (NIP) feedback from the MS based on the first feedback information;
   receiving, at the BS, the NIP feedback from the MS;
   selecting, at the BS, a first NIP threshold and a second NIP threshold based on the NIP feedback from the MS; and
   receiving, at the BS, a request from the MS of one of a first MIMO scheme and a second MIMO scheme, the request based at least partly upon a comparison of the calculated first and second NIPs with the first NIP threshold and the second NIP threshold.

2. The method of claim 1, wherein the first feedback information comprises at least one of a Channel Quality Indicator (CQI), a Precoding Matrix Index (PMI), and a rank.

3. The method of claim 1, wherein the NIP is defined as a ratio of an average interference power from one dominant interference BS to a total interference power received by the MS.

4. The method of claim 1, wherein the first NIP threshold is a threshold for a per BS NIP of one adjacent BS, the second NIP threshold is a threshold for a sum of NIPs of two or more adjacent BSs whose per BS NIP is larger than the first NIP threshold, the first NIP is a per BS NIP of two or more adjacent BSs in an adjacent BS list, and the second NIP is a sum of NIPs when the per BS NIP is higher than the first NIP threshold.

5. The method of claim 1, wherein the first MIMO scheme is a single BS precoding scheme using multi-BS coordination, which comprises PMI coordination and interference nulling, and
   the second MIMO scheme comprises a joint MIMO transmission across multiple BSs scheme.

6. The method of claim 1, wherein receiving, at the BS, the request from the MS of one of the first MIMO scheme and the second MIMO scheme comprises:
   when the second NIP is less than the second NIP threshold and the first NIP is greater than or equal to the first NIP threshold, receiving, at the BS, an event-driven request fed back from the MS to operate in the first MIMO scheme;
   requesting, at the BS, feedback information required for the first MIMO scheme from the MS using a Feedback_Polling_IE message with respect to the first MIMO scheme operation request from the MS; and
   receiving, at the BS, feedback information from the MS required for the first MIMO scheme.

7. The method of claim 1, wherein receiving, at the BS, the request from the MS of one of the first MIMO scheme and the second MIMO scheme comprises:
   when the second NIP is greater than or equal to the second NIP threshold, receiving, at the BS, an event-driven request fed back from the MS using a MAC management message to operate in the second MIMO scheme;
   requesting, at the BS, feedback information required for the second MIMO scheme from the MS using a Feedback_Polling_IE message; and
   upon reception at the MS of the Feedback_Polling_IE message requesting the necessary feedback information for the second MIMO scheme operation, periodically receiving, at the BS, a feedback header together with the requested information for codebook feedback from the MS, or receiving uplink sounding allocated by Sounding_Allocation_IE( ) for sounding feedback from the MS.

8. The method of claim 1, further comprising:
   broadcasting or unicasting, at the BS, the selected first NIP and second NIP to the MS.

9. A method for triggering multicell Multiple Input Multiple Output (MIMO) schemes in a multiple antenna system, the method comprising:
   receiving, at a Base Station (BS), a first feedback information for single-cell closed-loop MIMO from a Mobile Station (MS);
   requesting, at the BS, Normalized Interference Power (NIP) feedback from the MS based on the first feedback information;
   receiving, at the BS, the NIP feedback from the MS;
   selecting, at the BS, a first NIP and a second NIP based at least partly upon the NIP feedback from the MS; and
   selecting, at the BS, one of a first MIMO scheme and a second MIMO scheme by comparing the first and second NIPS with a first NIP threshold and a second NIP threshold.

10. The method of claim 9, wherein the first feedback information comprises at least one of a Channel Quality Indicator (CQI), a Precoding Matrix Index (PMI), and a rank.

11. The method of claim 9, wherein the NIP is defined as a ratio of an average interference power from one dominant interference BS to a total interference power received by the MS.

12. The method of claim 9, wherein the first NIP threshold is a threshold for a per BS NIP of one adjacent BS, the second NIP threshold is a threshold for a sum of NIPs of two or more adjacent BSs whose per BS NIP is larger than the first NIP threshold, the first NIP is a per BS NIP of two or more adjacent BSs in an adjacent BS list, and the second NIP is a sum of NIPs when the per BS NIP is higher than the first NIP threshold.

13. The method of claim 9, wherein the first MIMO scheme is a single BS precoding scheme using multi-BS coordination, which comprises Precoding Matrix Index (PMI) coordination and interference nulling, and
   the second MIMO scheme comprises a joint MIMO transmission across multiple BSs scheme.

14. The method of claim 9, wherein the selecting, at the BS, of one of the first MIMO scheme and the second MIMO scheme by comparing the first and second NIPs with the first NIP threshold and the second NIP threshold comprises:
   when the second NIP is less than the second NIP threshold and the first NIP is greater than or equal to the first NIP threshold, requesting, at the BS, feedback information required for the first MIMO scheme from the MS using a Feedback_Polling_IE message with respect to the first MIMO scheme operation request from the MS; and receiving, at the BS, feedback information required for the first MIMO scheme from the MS.

15. The method of claim 9, wherein the selecting, at the BS, of one of the first MIMO scheme and the second MIMO scheme by comparing the first and second NIPs with the first NIP threshold and the second NIP threshold comprises:

when the second NIP is greater than or equal to the second NIP threshold, requesting, at the BS, feedback information required for the second MIMO scheme from the MS using a Feedback_Polling_IE message; and upon reception at the MS of the Feedback_Polling_IE message requesting the necessary feedback information for the second MIMO scheme operation, periodically receiving, at the BS, a feedback header together with the requested information for codebook feedback from the MS, or receiving uplink sounding allocated by Sounding_Allocation_IE( ) for sounding feedback from the MS.

16. A method for triggering multicell Multiple Input Multiple Output (MIMO) schemes in a multiple antenna system, the method comprising:

receiving, at a Base Station (BS), a Normalized Interference Power (NIP) feedback from a Mobile Station (MS), the NIP calculated at the MS;

selecting, at the BS, a first NIP threshold and a second NIP threshold based on the NIP feedback from the MS; and selecting, at the BS, one of a first MIMO scheme and a second MIMO scheme by comparing a first NIP and a second NIP received from the MS with the first NIP threshold and the second NIP threshold.

17. The method of claim 16, wherein the NIP is defined as a ratio of an average interference power from one dominant interference Base Station (BS) to a total interference power received by the MS.

18. The method of claim 16, wherein the first NIP threshold is a threshold for a per BS NIP of one adjacent BS, the second NIP threshold is a threshold for a sum of NIPs of two or more adjacent BSs whose per BS NIP is larger than the first NIP threshold, the first NIP is a per BS NIP of two or more adjacent BSs in an adjacent BS list, and the second NIP is a sum of NIPs when the per BS NIP is higher than the first NIP threshold.

19. The method of claim 16, wherein the first MIMO scheme is a single BS precoding scheme using multi-BS coordination, which comprises Precoding Matrix Index (PMI) coordination and interference nulling, and the second MIMO scheme comprises a joint MIMO transmission across multiple BSs scheme.

20. The method of claim 16, wherein the selecting, at the BS, of one of the first MIMO scheme and the second MIMO scheme by comparing the first NIP and the second NIP with the first NIP threshold and the second NIP threshold comprises:

when the second NIP is less than the second NIP threshold and the first NIP is greater than or equal to the first NIP threshold, receiving, at the BS., an event-driven request from the MS to operate in the first MIMO scheme;

requesting, at the BS, feedback information required for the first MIMO scheme from the MS using a Feedback_Polling_IE message with respect to the first MIMO scheme operation request from the MS; and receiving, at the BS, information required for the first MIMO scheme from the MS.

21. The method of claim 16, wherein the selecting, at the BS, of one of the first MIMO scheme and the second MIMO scheme by comparing the first NIP and the second NIP with the first NIP threshold and the second NIP threshold comprises:

when the second NIP is greater than or equal to the second NIP threshold, receiving, at the BS, an event-driven request from the MS using a MAC management message to operate in the second MIMO scheme;

requesting, at the BS, feedback information required for the second MIMO scheme from the MS using a Feedback_Polling_IE message; and upon reception at the MS of the Feedback_Polling_IE message requesting the necessary feedback information for the second MIMO scheme operation, periodically receiving, at the BS, a feedback header together with the requested information for codebook feedback from the MS, or receiving uplink sounding allocated by Sounding_Allocation_IE( ) for sounding feedback from the MS.

* * * * *